United States Patent [19]

Smith

[11] 4,172,562

[45] Oct. 30, 1979

[54] PROCESS FOR WINDING FILAMENTS ON A MANDREL

[75] Inventor: Derek R. Smith, Bristol, England

[73] Assignee: Union Carbide Corporation, New York, N.Y.

[21] Appl. No.: 895,473

[22] Filed: Apr. 11, 1978

Related U.S. Application Data

[63] Continuation of Ser. No. 753,811, Dec. 23, 1976, abandoned.

[51] Int. Cl.² ............................................. B65H 81/00
[52] U.S. Cl. .................................... 242/7.02; 156/169; 156/175; 156/425; 242/7.22; 242/157 R
[58] Field of Search ............... 156/169, 172, 173, 175, 156/425, 431, 429, 392, 494, 350, 366, 432, 445, 267; 242/7.21, 7.22, 7.23, 153, 154, 7.02; 57/4, 5, 10, 11; 226/199, 195

[56] References Cited

U.S. PATENT DOCUMENTS

| | | | |
|---|---|---|---|
| 2,615,656 | 10/1952 | Strake | 242/154 |
| 3,201,298 | 8/1965 | Baker et al. | 156/431 |
| 3,966,133 | 6/1976 | Gelin | 242/154 |

*Primary Examiner*—Michael W. Ball
*Attorney, Agent, or Firm*—John R. Doherty

[57] ABSTRACT

A filament winding apparatus having means associated with the winding ring thereof for automatically widening the space between the guide surfaces of the ring at predetermined intervals so as to allow for the removal of any residue or debris which may accumulate therein during operation and cause filament breakage. The apparatus is particularly suitable for winding fibers, such as carbon fibers, which have a susceptibility to shed or fragment during winding, and thereby cause an accumulation of debris in the winding ring.

8 Claims, 1 Drawing Figure

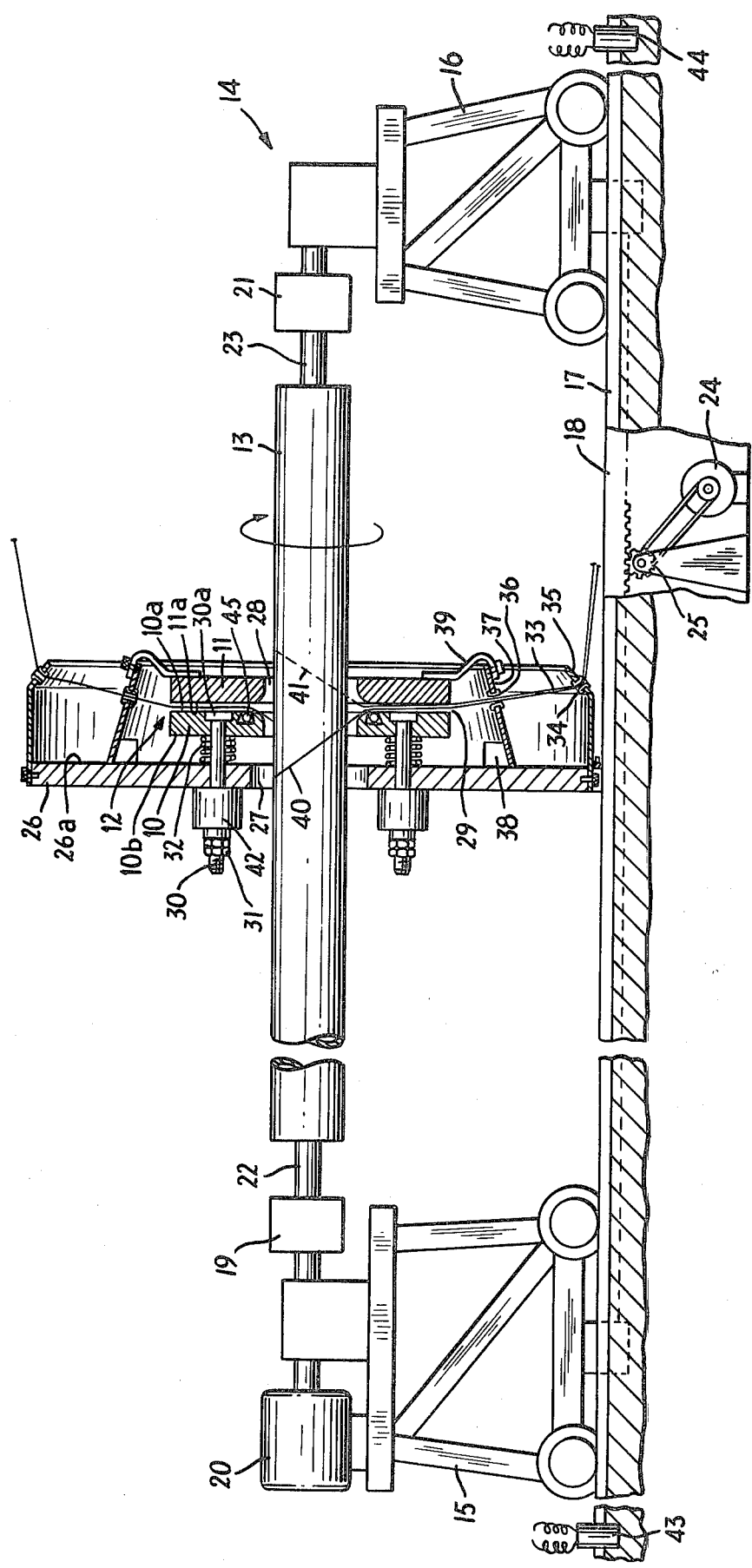

PROCESS FOR WINDING FILAMENTS ON A MANDREL

This application is a continuation of application Ser. No. 753,811, filed Dec. 23, 1976, now abandoned.

BACKGROUND OF THE INVENTION

This invention relates to an improved process for winding filaments about a mandrel. More particularly, this invention relates to a filament winding apparatus having means associated with the winding process using ring thereof for automatically clearing away residue and debris which accumulates therein during operation and causes filament breakage.

Apparatus for simultaneously winding a plurality of filaments about a mandrel in a helical manner are well known in the art and have been discussed, for example, in U.S. Pat. Nos. 3,201,298 and 3,032,461. Such apparatus generally consists of a mandrel and a winding ring peripherally surrounding the mandrel which serves to guide a plurality of filaments to the surface of the mandrel in a radial fashion. The winding ring and mandrel are capable of undergoing reciprocating axial movement and rotating with respect to each other, so that when a plurality of filaments in peripherally distributed arrangement are passed through the winding ring onto the surface of the mandrel, they are helically wound about the mandrel in a continuous manner by this reciprocating and rotating motion. If desired, a plurality of winding rings may be spaced about the mandrel to allow more than one layer of filaments to be applied to the mandrel at a time. These winding rings may be constructed in a number of ways, but conveniently are comprised of two adjacently situated annular plates which lie concentric to the mandrel and which have oppositely facing surfaces between which the filaments pass and by means of which they are guided to the mandrel.

Filament winding apparatus of this type has been successfully used to continuously wind glass and other filaments without the occurrence of any problems. However, when attempts were made to wind carbon fibers with this equipment, it was found that a considerable amount of debris in the form of a fine fluff would accumulate in and block the winding ring due to the susceptibility of the fiber to shed or fragment. When the winding ring also served as a means for dispensing and applying a resin binder to the fibers, the problem was accentuated by the accumulation of resin in the ring. As a result of this accumulation of residue, and the high fragility and brittleness of carbon fibers, frequent filament breakage would occur which necessitated shutting down the equipment and interrupting production in order to allow the winding ring to be cleaned.

SUMMARY OF THE INVENTION

The present invention provides an improved process for winding filaments using apparatus having means associated with the winding ring for automatically widening the space between adjacent guide surfaces of the winding ring at predetermined intervals so as to allow for the removal of residue and debris which accumulates therein during operation and causes filament breakage.

BRIEF DESCRIPTION OF THE DRAWING

The sole FIGURE in the drawing shows a partial cutaway side elevation view of a filament winding apparatus having means associated therewith for automatically widening the space between the oppositely facing surfaces of two adjacently situated annular plates which together make up the winding ring of the apparatus.

DETAILED DESCRIPTION OF THE INVENTION

In order to prevent the build-up of residue and debris in the winding ring of a filament winding apparatus, which if allowed to accumulate may cause filament breakage during operation, the present invention provides a means for automatically widening the space between the adjacent guide surfaces of the winding ring at predetermined intervals so as to allow for the removal of any accumulation before filament breakage occurs.

While the invention will be described with particular reference to a winding ring comprised of two adjacently situated annular plates which lie concentric to the mandrel and have oppositely facing surfaces, it should be understood that a number of other types of winding rings can be employed, such as, e.g., a winding ring consisting of several tubular guides, as discussed in U.S. Pat. No. 3,201,298.

Referring to the drawing, annular plates 10 and 11 having flat guide surfaces 10a and 11a facing oppositely together make up winding ring 12 of a filament winding apparatus. The winding ring peripherally surrounds mandrel 13 mounted on carriage 14 arranged to reciprocate the mandrel axially through the ring and at the same time rotate the mandrel. The carriage 14 consists of two trolleys 15 and 16 running on rails 17 and joined by bar 18. The trolley 15 supports a headstock 19 driven by a motor 20. The trolley 16 supports a tailstock 21. The mandrel 13 is removably mounted on the headstock and tailstock via spindles 22 and 23. The carriage can be shifted axially by a motor 24 and drive 25. The speeds and directions of rotation of the motors are individually controllable by known means.

The winding ring parts proper are supported relatively to other parts of the winding apparatus by a main structure 26. Mandrel 13 passes through apertures 27 and 28 in main structure 26 and winding ring 12 during its axial reciprocation. The width of the space 29 between annular plates 10 and 11 can be adjusted by axially advancing or retracting plate 10 by means of screw 30 set in plate 10 and maintained in place by nut 31. Spring 32 situated between the outer surface 10b of plate 10 and the inner surface 26a of main structure 26 maintains plate 10 firmly in position against the head 30a of screw 30 recessed in plate 10.

Carbon fibers 33 are drawn from bobbins carried by a support, not shown, through a large number of hollow fairleads 34 which are mounted in conical section 35, and thence through a like number of fairleads 36 in conical section 37. Conical section 37 is supported at its end of widest diameter by brackets 38 attached to main structure 26, and is attached at its end of narrowest diameter to bars 39 which in turn are attached to and support annular plate 11. The fibers, which may be in the form of individual filaments, or multifilament roving, yarn, or tow, and the like, are then guided from the fairleads in conical section 37 to the mandrel between surfaces 10a and 11a of annular plates 10 and 11 positioned concentric to the mandrel, the inner peripheries of which plates define aperture 28 through which the mandrel passes. As mandrel 13 undergoes rotational and reciprocating movement relative to the plates, the fibers are continuously wrapped about it in a helical manner, first in one direction and then in the other as the reciprocating movement of the mandrel is reversed. When the mandrel is moving axially to the left, as seen in the drawing, the fibers follow paths such as are shown by full line 40, and when the direction of movement of the mandrel reverses, the fibers follow alternative paths such as indicated by dotted line 41. In order to prevent damage to the fibers, the inner peripheries of annular plates 10 and 11 are radiused on the inner diameters of guide surfaces 10a and 11a.

When the apparatus is employed to wind carbon fibers, the relatively stiff fibers soon begin to shed and/or fragment, and residual debris from the filaments quickly begins to accumulate between guide surfaces 10a and 11a of plates 10 and 11. In order to provide for the removal of this debris which eventually causes the fibers to break if allowed to accumulate, air cylinder 42, or other suitable mechanical means, is periodically activated so as to retract plate 10 axially and widen the space between guide surfaces 10a and 11a of plates 10 and 11. As the gap between surfaces 10a and 11a is increased, the accumulated debris between plates 10 and 11 is carried away by the fibers passing between the two plates and deposited upon the mandrel. Upon deactivation of air cylinder 42, plate 10 is returned to its original position by means of pressure exerted by spring 32. While it is possible for air cylinder 42 to be activated and de-activated manually by means of an air valve, it is preferably activated automatically at predetermined intervals by means of an air valve controlled by a sequence timer or, most preferably, by means of a solenoid-operated air valve controlled by limit switches responsive, e.g., to strikers 43 and 44 adjustably mounted on rails 17. By properly positioning the limit switches, air cylinder 42 may be activated at intervals which will allow debris carried by the fibers to be deposited near the ends of the mandrel. The ends containing this debris may, after curing, then be cut off and discarded.

While the winding ring described herein is intended to be stationary, the same principles may be applied to winding rings which move axially or rotate, or both move axially and rotate. Moreover, the axis of the mandrel and winding ring may be vertical if desired.

Oftentimes it is desirable to impregnate the fibers with a resin binder, e.g., a phenolic, epoxy or polyester resin. This binder may be applied to the fibers as they approach the mandrel, or it may be applied progressively to the partially completed winding on the mandrel during its reciprocation, or subsequently to the wholly completed winding. Alternatively, it is possible to first form a prepreg of the fibers and binder, and then wind the prepreg upon the mandrel. In any event, after the winding has been completed, the mandrel is removed from the apparatus and subjected to conditions for curing the resin so as to form a fiber-reinforced composite. Thereafter the composite so formed may be removed from the mandrel.

In order to apply a resin binder to the fibers as they approach the mandrel, annular plate 10 may be provided with a continuous circumferential slot 45 through which a liquid resin may be fed so as to wet the filaments passing over the guide surface. Naturally, continuous slot 45 may be replaced by closely spaced apertures in the ring. The liquid resin may be delivered to plate 10 through one or more stationary pipes, not shown.

What is claimed is:

1. In a process for winding filaments about a mandrel by means of a filament winding apparatus having a mandrel and a winding ring peripherally surrounding the mandrel which comprises causing the winding ring and mandrel to undergo reciprocating axial movement and to rotate with respect to each other while guiding a plurality of filaments to the surface of the mandrel in a radial manner between adjacent guide surfaces of the winding ring so as to cause the filaments to be wrapped about the mandrel, the improvement which comprises automatically and repeatedly widening the space between the adjacent guide surfaces of the winding ring at predetermined intervals so as to allow any debris present between the guide surfaces to be deposited near the ends of the mandrel, and subsequently closing the space and returning the guide surfaces to their original position.

2. A process as in claim 1 wherein the predetermined intervals are regulated by limit switches responsive to the reciprocating axial movement of the winding ring and mandrel with respect to each other.

3. A process as in claim 1 wherein an air cylinder is employed to widen the space between the adjacent guide surfaces of the winding ring.

4. A process as in claim 3 wherein the air cylinder is activated by means of a solenoid-operated air valve controlled by limit switches responsive to the reciprocating axial movement of the winding ring and mandrel with respect to each other.

5. A process as in claim 1 wherein the filament winding ring is comprised of two adjacently situated annular plates which lie concentric to the mandrel and which have oppositely facing surfaces between which the filaments pass and by means of which they are guided to the mandrel.

6. A process as in claim 5 wherein the predetermined intervals are regulated by limit switches responsive to the reciprocating axial movement of the winding ring and mandrel with respect to each other.

7. A process as in claim 5 wherein an air cylinder is employed to widen the space between the oppositely facing guide surfaces of the adjacently situated annular plates of the winding ring.

8. A process as in claim 7 wherein the air cylinder is activated by means of a solenoid-operated air valve controlled by limit switches responsive to the reciprocating axial movement of the winding ring and mandrel with respect to each other.

* * * * *

UNITED STATES PATENT AND TRADEMARK OFFICE
CERTIFICATE OF CORRECTION

PATENT NO. : 4,172,562
DATED : October 30, 1979
INVENTOR(S) : Derek R. Smith

It is certified that error appears in the above—identified patent and that said Letters Patent is hereby corrected as shown below:

Column 1, line 12, "filament winding apparatus" should read -- filament winding process using apparatus --.

Column 1, lines 13 and 14, "winding process using ring" should read -- winding ring --.

Signed and Sealed this

Twenty-ninth Day of April 1980

[SEAL]

Attest:

SIDNEY A. DIAMOND

Attesting Officer

Commissioner of Patents and Trademarks